May 18, 1965 J. W. SMITH 3,184,750
ELECTROLYTIC FACSIMILE RECORDER APPARATUS
Filed May 31, 1962
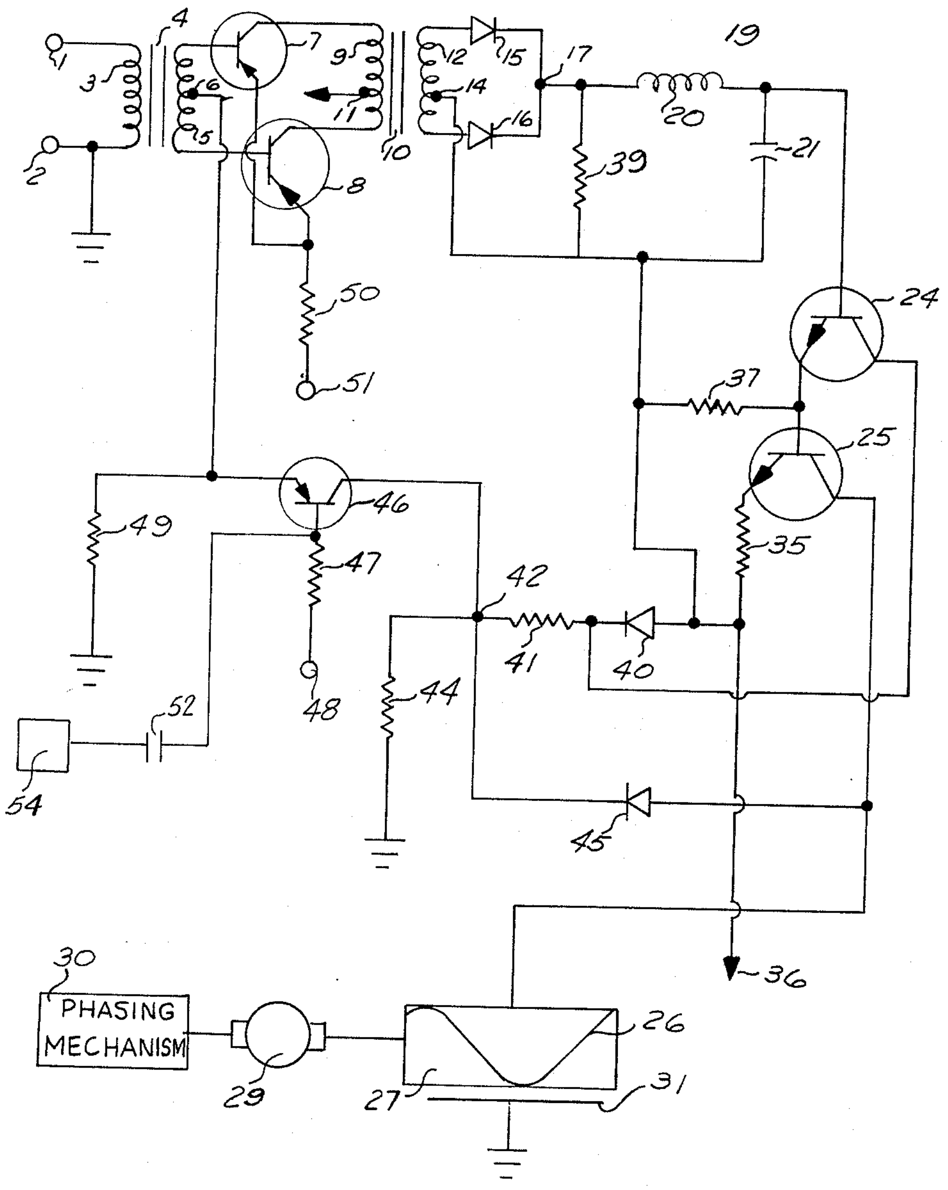
INVENTOR.
JOHN W. SMITH
BY
Attorney

United States Patent Office 3,184,750
Patented May 18, 1965

3,184,750
ELECTROLYTIC FACSIMILE RECORDER APPARATUS

John W. Smith, Whitestone, N.Y., assignor to Hogan Faximile Corporation, New York, N.Y.

Filed May 31, 1962, Ser. No. 199,046
12 Claims. (Cl. 346—74)

The present invention relates to electric facsimile systems and more particularly to electrolytic facsimile recorder apparatus.

In electrical facsimile systems, graphic material such as pictures, drawings, printed or typed material or the like, is scanned and the information converted into electric facsimile signals, which are used either locally or remotely to produce a recorded "facsimile" of the original or "subject copy."

In a typical facsimile transmitter subject copy is continuously moved past a scanning area where it is illuminated and its reflected image is focussed on a scanner which converts the scanned information into a series of trains of electric video signals. A so called "backstroke interval" is provided between each train of electric video signals for the transmission of phasing or other signals.

In a typical facsimile receiver recording means are provided in which an electrolytic recording medium from a supply roll is continuously moved between a fixed linear electrode and a helical electrode which is rotatably carried by a drum. The recording is made by the passage of the electric video signals through the recording medium. Suitable phasing mechanism is provided so that the copy is properly phased responsive to the transmitted phasing pulses. Proper phasing is accomplished when the received video signal for each line of scan is recorded starting at the lefthand margin of the recording medium.

The density of the mark produced on the electrolytic recording medium is proportional to the magnitude of the electric current passed therethrough. The effective resistance of the electrolytic recording medium may vary over rather wide limits due to changes in the moisture content of the recording medium, to variations in the contact pressure between the electrodes, and because of variations in the composition of the recording medium. Therefore, it is desirable to mark an electrolytic recording medium from a constant current source so that the same current will flow through the recording medium for a given input signal regardless of slow or instantaneous variations in the resistance of the recording medium.

Heretofore marking apparatus has utilized tetrode or pentode vacuum tubes which inherently have a high internal plate resistance and thus behave like constant current sources. The use of transistors in place of the vacuum tubes results in a reduction in size of the apparatus and in its power consumption. However, transistors are inherently low internal impedance devices and thus special circuits must be devised so that the transistors can be used to provide the desired constant current flow.

An object of the present invention is to provide a new and improved electrolytic recorder apparatus utilizing transistors.

Another object of the present invention is to provide an electrolytic facsimile recorder apparatus utilizing transistors and in which the same current will flow through the recording medium regardless of variations in the resistance of the marking circuit.

Another object of the invention is to provide an electrolytic recorder apparatus utilizing transistors and in which protective means are incorporated protecting the transistors in the absence of electrolytic recording medium between the electrodes.

Another object of the invention is to provide an electrolytic facsimile recorder apparatus utilizing transistors and in which means is incorporated for blanking out phasing pulses.

Another object of the invention is to provide an electrolytic facsimile recorder apparatus utilizing transistors which is simple and economical in manufacture, efficient in operation and durable in use.

Other objects and advantages of the invention will be apparent from the following description and from the accompanying drawing which shows, by way of example, an embodiment of the invention.

The drawing is a schematic wiring diagram showing a preferred form of circuitry incorporating the invention.

Referring to the drawing there is shown schematically an electrolytic facsimile recorder apparatus in accordance with the invention and including a pair of terminals 1 and 2 connected to primary winding 3 of an input transformer 4 having a secondary winding 5 with a midtap 6. The outer legs of the secondary winding 5 are connected to transistors 7 and 8, each having a base, an emitter and a collector respectively identified as *7b*, *7e*, *7c*, *8b*, *8e*, and *8c*. The collectors *7c* and *8c* are connected to the ends of primary winding 9 of an output transformer 10, the primary winding 9 having a midtap as indicated at 11 and a secondary winding 12 having a midtap 14. The ends of the secondary winding 12 are connected to diodes 15 and 16 of a diode demodulator circuit having an output 17.

A low pass filter 19 including an inductance 20 and a capacitance 21 is connected between the output 17 of the diode demodulator circuit and an amplifier including transistors 24 and 25 connected in cascade. Each of the transistors 24 and 25 includes a base, an emitter and a collector respectively identified as *24b*, *24e*, *24c*, *25b*, *25e* and *25c*. The inductance 20 of the low pass filter 19 has one end connected to the output 17 of the diode demodulator circuit and its other end connected to the base *24b* of the transistor 24. The capacitor 21 has one terminal connected to the base *24b*. The collector *25c* of the transistor 25 is connected to a helix 26 carried by a rotatable drum 27 driven by a motor 29 incorporating in its drive a phasing mechanism 30. Positioned adjacent to the drum 27 is a linear electrode 31 connected to ground.

The helix 26 and its cooperating linear electrode 31 together with the rotatable means for the helix 26 are well known in the art and hence need not be described in detail. As is usual electrolytic recording medium from a roll is passed between the electrodes 26 and 31 for marking responsive to the passage of the current between the electrodes.

A feedback emitter resistor 35 is connected at one end to the emitter *25e* and at its other end to a supply voltage 36. The supply voltage 36 is also connected through an emitter resistor 37 to the emitter *24e*. The capacitor 21 has its other side connected to the power supply 36. A stabilizing base return resistor 39 is connected between the output 17 and the power supply 36. The midpoint 14 of the output transformer 10 is also connected to the power supply 36. A collector supply for the collector *24c* is provided by a diode 40 having one end connected to the power supply 36 and its other end connected to the collector *24c*. The diode 40 is also connected through a resistor 41 to a junction 42 in series with a resistor 44 to ground.

Collector 25c is connected through a diode 45 to the junction 42 and to collector 46c of a switching transistor 46 also having a base 46b and an emitter 46e. The base 46b is connected through a biasing resistor 47 to a potential 48. The emitter 46e is connected to the mid-point 6 of the transformer 4 and through a resistor 49 to ground. The emitters 7e and 8e are connected through a resistor 50 to a biasing potential 51. The base 46b is coupled through a capacitor 52 to transmitter pulse producing means 54 well known in the art.

In the operation of the electrolytic facsimile recorder apparatus the drum 27 is set into rotation by appropriate control means with an electrolytic recording medium in position between the electrodes 26 and 31. An amplitude modulated carrier is applied to the input terminals 1 and 2, the signals being passed through the transformer 4 and amplified in the transistors 7 and 8 before application to the transformer 10 and demodulated in the diodes 15 and 16.

As the video signals are passed through the low pass filter 19 their rising and falling edges are sharpened somewhat by increasing the rates of the rise and the fall times thereof. In the transistors 24 and 25 the demodulated signal is amplified and applied to the helix 26 for marking the recording medium. In the event the resistance between the electrodes 26 and 31 varies due to irregularities in the surface of the recording medium, because of variations in the moisture content of the recording medium, or for other reasons, a change takes place in the current through the feedback resistor 35, thus causing a corrective feedback signal to be applied at the center tap 14 of the transformer 10. The effect of a variation in resistance of the recording medium is to tend to vary the current through the feedback resistor 35 which tends to affect the voltage thereacross. Thus, there is effected a change in current through the cascade connected amplifiers 24 and 25 which tends to maintain the marking current constant. For example, for a two to one change in the resistance of the marking medium, and with a gain of five hundred in the amplifier, the current change is of the order of only one five-hundredth of the value it would be without the current feedback connection.

During the time when a phasing signal is being passed, blanking of the marking signal is provided by action of the transmitter pulse producing means 54 in biasing the transistor 46 into nonconduction so that base potential is removed from the transistors 7 and 8, thereby preventing the transmission of the phasing signal from the modulated carrier and which would cause a black mark to appear on the recording medium.

By the use of the diode 45, protective means is provided so that in the event no electrolytic recording medium is positioned between the electrodes 26 and 31 and they become shorted no damage from overload will result to the transistor 25. The diode 45 drops the potential at the junction 42 to practically zero thereby effectively dropping the base potential for the transistors 7 and 8 rendering them nonconductive. Thus the output of collector 25c drops to a safe value and no damage will be caused to the transistor 25.

"Blocking" is the term used to describe fouling of the helix electrode 26 by debris such as may result from the frictional contact of the helix 26 with the surface of the electrolytic recording medium. A small forward current prevents the adherence of the debris and thus prevents blocking. It is important of course that the forward current be below the marking threshold of the electrolytic recording medium so as not to cause a faint mark which would appear as a discoloration of the background of the recording.

The diode 45 minimizes blocking during the normal operation of the recording system in that it allows the passage of a small forward marking current between the electrodes 26 and 31 during the interval when no signal is being passed.

Typical circuit constants of a commercial embodiment of the invention are as follows:

Transformers 4 and 10—Microtran SMT9FB 1200–600 ratio
Transistors 7 and 8—Motorola 2N651
Potential 11——18 v.
Diodes 15 and 16—Transitron 1N625
Inductance 20:
- .125 henry
- .5 henry
- .75 henry Capacitance 21:
- .0045 mfd. (6600 cycles element frequency or 900 lines per minute resolution)
- .0075 mfd. (2666 cycles element frequency or 360 lines per minute resolution)
- .02 mfd. (1333 cycles element frequency or 180 lines per minute resolution)

Transistor 24—Texas Instrument TI 484
Transistor 25—Transitron 2N1648
Resistor 35—10 ohms
Power supply 36——100 v.
Resistor 37—2.2K ohms
Diode 40—Motorola 10 M 6.8 Z
Resistor 41—1.5K ohms
Resistor 44—82 ohms
Transistor 46—GE 2N321
Resistor 47—150K
Potential 48——18 v.
Resistor 49—100K
Resistor 50—2.5 ohms
Biasing potential 51——4 v.
Capacitor 52—.1 mfd.

While the invention has been described and illustrated with reference to a specific embodiment thereof it will be understood that other embodiments may be resorted to without departing from the invention. Therefore, the form of the invention set out above should be considered as illustrative and not as limiting the scope of the following claims.

I claim:

1. Electrolytic facsimile recorder apparatus comprising input means adapted to receive video electric signals, a pair of cooperating electrodes adapted to receive an electrolytic recording medium therebetween, a transistor having a base, an emitter and a collector, the input connected between the base and the emitter, and the electrodes connected in series with a power supply and an emitter feedback resistor between the collector and the emitter, whereby a voltage change across the feedback resistor is reflected back through the emitter and base to the input, thereby providing current feedback action.

2. Electrolytic facsimile recorder apparatus comprising input means to receive video electric signals, a pair of amplifying transistors connected in cascade each having a base, an emitter and a collector, a pair of cooperating electrodes adapted to receive an electrolytic recording medium therebetween, the input connected between the base and the emitter of the first transistor, the electrodes connected in series with a power supply, and an emitter feedback resistor connected between the emitter and the collector of the second transistor in series with the power supply, whereby a feedback loop is provided through the feedback resistor and the transistors to the base of the first transistor.

3. Electrolytic facsimile recorder apparatus comprising input means to receive video electric signals, a pair of amplifying transistors connected in cascade each having a base, an emitter and a collector, a pair of cooperating electrodes adapted to receive an electrolytic recording medium therebetween, the input connected between the base and the emitter of the first transistor, the electrodes connected in series with a power supply, an emitter feedback resistor connected between the emitter and the collector of the second transistor in series with the power supply, whereby a feedback loop is provided through the feedback resistor and the transistors to the base of the first transistor, and overload prevention means for the second transistor including a diode connected from the collector of the second transistor to the input means and operative upon a drop in resistance between the electrodes to block the input signal.

4. Electrolytic facsimile recorder apparatus comprising input means to receive video electric signals, a pair of amplifying transistors connected in cascade each having a base, an emitter and a collector a pair of cooperating electrodes adapted to receive an electroyltic recording medium therebetween, the input connected between the base and the emitter of the first transistor, the electrodes connected in series with a power supply, an emitter feedback resistor connected between the emitter and the collector of the second transistor in series with the power supply, whereby a feedback loop is provided through the feedback resistor and the transistors to the base of the first translator, and overload prevention means for the second transistor including a diode connected from the collector of the second transistor to the input means and operative upon a drop in resistance between the electrodes to block the input signal, the diode adapted to normally draw a forward current through the electrolytic recording medium preventing blocking of the electrodes.

5. Electrolytic facsimile recorder apparatus comprising an input for a facsimile electric video signal, a pair of transistors connected in cascade each having a base, an emitter and a collector, the base of the first transistor supplied by the input, a helical marking electrode, the collector of the second transistor connected to the helical electrode, a linear marking electrode, the linear marking electrode connected to ground, a power supply, a feedback emitter resistor connected between the emitter of the second transistor and the power supply, an emitter resistor for the emitter of the first transistor connected to the power supply, and a diode connected between the collector of the second transistor and a biasing potential.

6. Electrolytic facsimile recorder apparatus comprising an input for a facsimile electric video signal, a pair of transistors connected in cascade each having a base, an emitter and a collector, the base of the first transistor supplied by the input, a helical marking electrode, the collector of the second transistor connected to the helical electrode, a linear marking electrode, the linear marking electrode connected to ground, a power supply, a feedback emitter resistor connected between the emitter of the second transistor and the power supply, an emitter resistor for the emitter of the first transistor connected to the power supply, a transistor switch, a diode connected in series with the transistor switch between the collector of the second transistor and a biasing potential, and control means for the transistor switch responsive to phasing pulses.

7. Electrolytic facsimile recorder apparatus comprising an input for a facsimile electric video signal, a pair of transistors connected in cascade each having a base, an emitter and a collector, the base of the first transistor supplied by the input, a helical marking electrode, the collector of the second transistor connected to the helical electrode, a linear marking electrode, the linear marking electrode connected to ground, a power supply, a feedback emitter resistor connected between the emitter of the second transistor and the power supply, an emitter resistor for the emitter of the first transistor connected to the power supply, and a voltage limiting diode connected between the power supply and the collector of the first transistor, a voltage divider having a midpoint and connected between the voltage limiting diode and ground.

8. Electrolytic facsimile recorder apparatus comprising an input for a facsimile electric video signal, a transformer having center tapped primary and secondary windings, the primary winding connected to the input, a pair of rectifying diodes connected in a diode demodulating circuit to the output transformer secondary winding, output means for the demodulating circuit, a pair of transistors connected in cascade each having a base, an emitter and a collector, the base of the first transistor supplied by the output of the demodulating circuit, a helical marking electrode, the collector of the second transistor connected to the helical electrode, a linear marking electrode, the linear marking electrode connected to ground, a power supply, a feedback emitter resistor connected between the emitter of the second transistor and the power supply, an emitter resistor for the emitter of the first transistor conneced to the power supply, and a voltage limiting diode connected between the power supply and the collector of the first transistor, a voltage divider having a midpoint and connected between the voltage limiting diode and ground.

9. Electrolytic facsimile recorder apparatus comprising an input for a facsimile electric video signal, a transformer having center tapped primary and secondary windings, the primary winding connected to the input, a pair of rectifying diodes connected in a diode demodulating circuit to the output transformer secondary winding, output means for the demodulating circuit, a low pass filter including an inductance and a capacitor connected to the output of the demodulating circuit, a pair of transistors connected in cascade each having a base, an emitter and a collector, a helical marking electrode, the collector of the second transistor connected to the helical electrode, a linear marking electrode, the linear marking electrode connected to ground, a power supply, a feedback emitter resistor connected between the emitter of the second transistor and the power supply, an emitter resistor for the emitter of the first transistor connected to the power supply, and a voltage limiting diode connected between the power supply and the collector of the first transistor, a voltage divider having a midpoint and connected between the voltage limiting diode and ground.

10. Electrolytic facsimile recorder apparatus comprising an input for a facsimile electric video signal, a transformer having center tapped primary and secondary windings, the primary winding connected to the input, a pair of rectifying diodes connected in a diode demodulating circuit to the output transformer secondary winding, output means for the demodulating circuit, a low pass filter including an inductance and a capacitor connected to the output of the demodulating circuit, a pair of transistors connected in cascade each having a base, an emitter and a collector, a helical marking electrode, the collector of the second transistor connected to the helical marking electrode, a linear marking electrode, the linear marking electrode connected to ground, a power supply, a feedback emitter resistor connected between the emitter of the second transistor and the power supply, an emitter resistor for the emitter of the first transistor connected to the power supply, a voltage limiting diode connected between the power supply and the collector of the first transistor, a voltage divider having a midpoint and connected between the voltage limiting diode and ground, and a base stabilizing resistor connected between the output of the demodulating circuit and the supply potential.

11. Electrolytic facsimile recorder apparatus comprising an input for a facsimile electric video signal, a transformer having center tapped primary and secondary windings, the primary winding connected to the input, a pair of rectifying diodes connected in a diode demodulating circuit to the output transformer secondary winding, output means for the demodulating circuit, a low pass filter including an inductance and a capacitor connected to the output of the demodulating circuit, a pair of transistors connected in cascade each having a base, an emitter and a collector, a helical marking electrode, the collector of the second transistor connected to the helical marking electrode, a linear marking electrode, the linear marking electrode connected to ground, a power supply, a feedback emitter resistor connected between the emitter of the second transistor and the power supply, an emitter resistor for the emitter of the first transistor connected to the power supply, a voltage limiting diode connected between the power supply and the collector of the first transistor, a voltage divider having a midpoint and connected between the voltage limiting diode and ground, a base stabilizing resistor connected between the output of the demodulating circuit and the supply potential, a transistor switch connected between the midpoint of the voltage divider and the midpoint of the first transformer, a diode connected between the helical marking electrode and the midpoint of the voltage divider, and control means for the transistor switch responsive to transmitted phasing pulses.

12. Electrolytic facsimile recorder apparatus comprising an input transformer having a primary winding and a center-tapped secondary winding, a pair of amplifying transistors each having a base, an emitter and a collector, the amplifying transistor bases respectively connected to the outer legs of the secondary winding, the amplifying transistor emitters connected to biasing means, the amplifying transistor collectors providing outputs, an output transformer having center tapped primary and secondary windings, the primary winding connected to the respective outputs of the amplifying transistors, a pair of rectifying diodes connected in a diode demodulating circuit to the output transformer secondary winding, output means for the demodulating circuit, a low pass filter including an inductance and a capacitor connected to the output of the demodulating circuit, a pair of transistors connected in cascade each having a base, an emitter and a collector, a helical marking electrode, the collector of the second transistor connected to the helical marking electrode, a linear marking electrode, the linear marking electrode connected to ground, a power supply, a feedback emitter resistor connected between the emitter of the second transistor and the power supply, an emitter resistor for the emitter of the first transistor connected to the power supply, a voltage limiting diode connected between the power supply and the collector of the first transistor, a voltage divider having a midpoint and connected between the voltage limiting diode and ground, a base stabilizing resistor connected between the output of the demodulating circuit and the supply potential, a transistor switch connected between the midpoint of the voltage divider and the midpoint of the first transformer, a diode connected between the helical marking electrode and the midpoint of the voltage divider, and control means for the transistor switch responsive to transmitted phasing pulses.

No references cited.

IRVING L. SRAGOW, *Primary Examiner.*